United States Patent [19]

Romashov et al.

[11] 4,340,163

[45] Jul. 20, 1982

[54] APPARATUS FOR REMOVAL OF INTERNAL FLASH FROM ELECTRIC-WELDED PIPES

[76] Inventors: Alexandr A. Romashov, ulitsa Rossiiskaya, 222, kv. 136; Gennady E. Levinsky, ulitsa Voroshilova, 3, kv. 15; Vladimir Y. Ivantsov, prospekt Lenina, 62, kv. 2, all of Chelyabinsk; Igor A. Astakhov, ulitsa Zavodskaya, 6, kv. 29, Taganrog; Vladimir A. Kuznetsov, ulitsa Lenina, 9, kv. 38, Polevskoi Sverdlovskoi oblasti, all of U.S.S.R.

[21] Appl. No.: 160,229

[22] Filed: Jun. 17, 1980

[51] Int. Cl.³ .......................... B23K 7/06; B23K 31/10
[52] U.S. Cl. ...................................... 228/19; 29/33 A; 228/125; 266/51
[58] Field of Search ................. 228/19, 125; 29/33 A; 148/9.5; 266/51, 52

[56] References Cited

U.S. PATENT DOCUMENTS

| | | | |
|---|---|---|---|
| 1,901,803 | 3/1933 | Davis | 148/9.5 X |
| 2,352,306 | 6/1944 | Anderson | 228/125 |
| 3,163,559 | 12/1964 | Thompson et al. | 148/9.5 X |
| 3,436,276 | 4/1969 | Thompson | 148/9.5 |

FOREIGN PATENT DOCUMENTS 435031  7/1974  U.S.S.R. .

OTHER PUBLICATIONS

Russian-language article having title "Manufacture of Electrically Welded Pipes Production Process", by Y. M. Matveev et al., Publishers Metallurgiya, 1967, Moscow.

Primary Examiner—Kenneth J. Ramsey
Attorney, Agent, or Firm—Fleit & Jacobson

[57] ABSTRACT

An apparatus for internal flash removal is intended for use in pipe manufacture and comprises a hollow supporting bar inserted into a pipe being welded and carrying an oxygen duct with a main nozzle and a cooled ferrite-holder. An additional nozzle having an oxygen conduit common with the main nozzle is arranged downstream of the main nozzle in the direction of welding. The main and the additional nozzles have oval outlets of different clear openings and are arranged at different acute angles to the weld in the same plane passing through the pipe axis and the weld. The apparatus ensures a quality weld surface finish inside the pipe.

8 Claims, 5 Drawing Figures

APPARATUS FOR REMOVAL OF INTERNAL FLASH FROM ELECTRIC-WELDED PIPES

FIELD OF THE INVENTION

The present invention relates to pipe rolling, and more particularly, to an apparatus for internal deseaming of electric-welded pipes.

DESCRIPTION OF THE PRIOR ART

There is known a great variety of devices for removing internal flash, equipped with mechanical accessories for removing flash (see, for example, the British Pat. No. 1,248,350 or the USSR Inventor's Certificate No. 428,814). All these devices are based on contacts between pipe being welded and spacing holders of the device, between the pipe and a cutting work tool. However, these devices wear out rapidly because of exposure to severe temperature and dynamic loads, the replacement of the cutting tool necessitating frequent mill stoppages with attendant drop in throughput capacity and greater cost of pipes. Moreover, these devices call for stricter tolerances on weld location with respect to the cutting tool working area, which involves higher cost of welding equipment.

There is known a device for removing internal flash from electric-welded pipes, which is based on burning the flash by a gas jet, for example, an oxygen one (see, for example, U.S. Pat. No. 2,352,306, according to which a jet of gas is directed obliquely upon a weld inside a pipe being welded, downstream of a welding unit, but not farther than the zone where the temperature of flash falls below the metal burning point.

Another known device for removal of internal flash in electric-welded pipes (see the USSR Inventor's Certificate No. 435,031, Cl. B21 C37/08 which is the prototype of the present application) comprises a hollow supporting bar with oxygen duct, a bar securing assembly and an interchangeable nozzle. In this device the nozzle is formed as a plunger located inside a cavity of the bar and having a cylindrical cavity. The nozzle working surface is provided with transversal grooves for oxygen supply and a longitudinal groove for removal of dislodged flash through a suction conduit, the nozzle being cooled during operation with the aid of a spring-loaded blade-type roller set freely on a shaft in the bar after the nozzle with respect to the motion of the pipe and pressed tight against the internal surface of the pipe.

The moment pipe welding starts, compressed oxygen enters the cavity underneath the plunger, thus pressing the latter against the internal surface of the pipe in the weld zone heated to a temperature close to that of the metal melting point. Excess compressed oxygen flows via borings into the transversal grooves forming with the internal surface of the pipe conduits which convey the compressed oxygen jet toward molten flash. Oxygen entry point in the grooves is located in the zone where the pipe surface temperature is not higher than 100° C. so as to prevent burning the pipe, the oxygen jet then flowing over the pipe internal surface and burning off flash. The transversal grooves are offset one with respect to another to avoid the jets cancelling each other out.

However, this device is rated to remove flash in pipes having diameters in excess of 100 mm and fails to ensure complete and effective flash removal, giving rise to "tongues" of molten flash which remain in the weld area as a result of oxygen jets being directed laterally at flash, another disadvantage being lesser oxygen utilization efficiency.

It is common knowledge that an oxygen jet delivered inside a pipe obliquely to the surface thereof in a direction opposite to that of pipe motion toward the edge heating and welding zone improves flash removal and oxygen utilization efficiency at the expense of the exothermic oxidation of edge faces heated for welding. However, a nozzle with a round outlet fails to ensure a uniform removal of flash throughout the width thereof. In addition, metal flash oxidation products fly off the welded edges upon the ferrite-holder and the nozzle to produce metal-like accumulations disturbing the welding process and affecting adversely the reliability of operation of the device.

SUMMARY OF THE INVENTION

It is therefore an object of the invention to provide an apparatus for removing internal flash from electric-welded pipes, wherein nozzles would be formed and arranged in a manner to improve pipe surface quality and utilize efficiently the oxygen jet to remove flash.

The above and other objects are attained in an apparatus for removing internal flash from electric-welded pipes, comprising a hollow supporting bar inserted into a pipe being welded, carrying an oxygen duct and ending in a nozzle, and a cooled ferrite-holder, wherein, according to the invention, an additional nozzle supplied from the same oxygen conduit as the main nozzle is provided downstream of the main nozzle with respect to direction of pipe welding, the main and the additional nozzles having oval outlets of different clear openings and being set at different acute angles with respect to the weld in the same plane passing through the pipe axis and the weld.

Such structural arrangement of the nozzles makes it possible to envelop all the pipe blank edge deformation zone with oxygen jets not only longitudinally, but also transversally, this also simplifying the unit proper, as flash can then be effectively removed even if the weld deviates from the nozzle axis.

In accordance with the invention, the main nozzle outlet has its vertical axis greater than its horizontal axis with the axes ratio ranging from 2:1 to 1.1:1, whereas the additional nozzle outlet is formed with its horizontal axis greater than its vertical axis, the axes ratio ranging from 3:1 to 1.1:1.

It is also useful to place the nozzle outlets one from another at a distance selected on condition of locating the pipe blank edge deformation zone during welding between the oxygen jets. This enhances oxygen utilization efficiency and improves weld surface quality.

The invention is also characterized by that the additional and the main nozzles are housed in a casing mounted on a ferrite-holder and communicating therewith to ensure the supply of a coolant, the casing being provided with orifices for the passage of oxygen and the exit of the cooling medium, this eliminating sticking of molten metal to the nozzles and the pipe surface.

The invention is also characterized by that the oxygen conduit is secured to the oxygen duct mounted concentrically inside the supporting bar which is shorter than the oxygen duct by the length of the ferrite-holder having a cavity continuing that of the supporting bar. This structural arrangement makes easy the replacement of the nozzle and of the ferrite-holder.

Therefore, the above unit ensures the manufacture of electric-welded pipes free from internal flash directly in the pipe manufacturing mill, eliminates sticking of disperse molten metal particles on the internal surfaces of pipes and provides quality surface of weld inside pipes.

BRIEF DESCRIPTION OF THE DRAWINGS

These and other objects and features of the invention become readily apparent from one embodiment thereof which will now be described, by way of example, with reference to the accompanying drawings, in which.

DESCRIPTION OF THE PREFERRED EMBODIMENT

Figure 1:
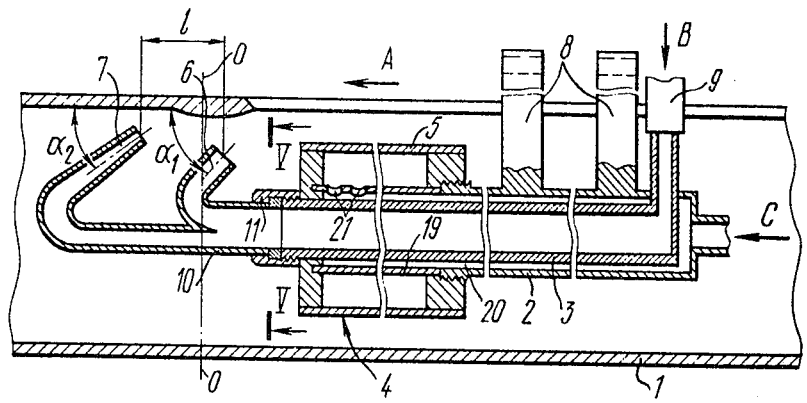
FIG. 1 is a general view of the internal deseaming unit for electric-welded pipes, longitudinal section.

Referring now to the above drawings, and to FIG. 1 in particular, there is shown therein an apparatus for removing internal flash, which is inserted inside an electric-welded pipe 1 (FIGS. 1 and 2) and comprises a supporting hollow bar 2, an oxygen duct 3, a ferrite-holder 4 of any known design housed in a cooled casing 5, a main nozzle 6 and an additional nozzle 7.

The hollow supporting bar 2 is held inside the pipe 1 being welded by brackets 8 mounted outside the pipe 1 on any fixed part of the pipe manufacturing mill, the brackets 8 and a connecting pipe 9 of the oxygen duct passing between the welded edges of the pipe 1.

The oxygen duct 3 is located concentrically inside the supporting bar 2 and carries at its end an oxygen conduit 10 serving as a supply conduit common to the main 6 and the additional 7 nozzles.

The oxygen conduit 10 is secured to the oxygen duct 3 by a threaded union 11, as shown on FIG. 1.

Figure 3:
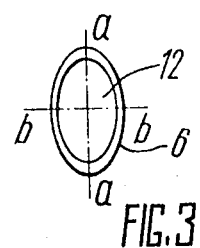
FIG. 3 illustrates the main nozzle outlet.
Figure 4:
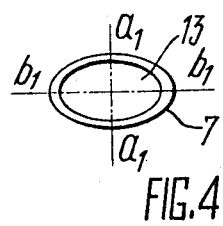
FIG. 4 shows the additional nozzle outlet.
Figure 5:
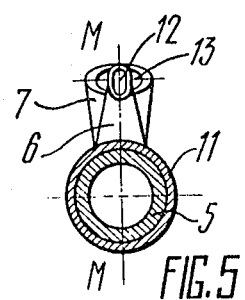
FIG. 5 is the cross section at V—V of FIG. 1.

The additional nozzle 7 is located downstream of the main nozzle 6 with respect to pipe motion during welding, the main 6 and the additional 7 nozzles having oval outlets respectively 12 (FIG. 3) and 13 (FIG. 4) of different clear openings, being located in the same plane M—M (FIG. 5) passing through the pipe axis and the weld, as shown in FIG. 5, and set at different acute angles respectively $\alpha_1$ (FIGS. 1 and 2) and $\alpha_2$ relative to the weld in opposite direction to pipe motion during welding.

The outlet 12 (FIG. 3) of the main nozzle 6 is formed with its vertical axis a—a greater than its horizontal axis b—b, the ratio of the axes a—a and b—b ranging from 2:1 to 1.1:1.

The outlet 13 (FIG. 4) of the additional nozzle 7 is formed with its horizontal axis $b_1$—$b_1$ greater than its vertical axis $a_1$—$a_1$ and the ratio of the axes $b_1$—$b_1$ and $a_1$—$a_1$ ranging from 3:1 to 1.1:1.

The angle $\alpha_1$ (FIGS. 1 and 2) of the main nozzle 6 is selected within the range of 35° to 45°, and the angle $\alpha_2$ of the additional nozzle 7, of 15° to 30°.

The outlets 12 and 13 of the nozzles 6 and 7 are spaced a distance 1 apart selected on the condition of situating the pipe blank edge deformation zone during welding between the oxygen jets issuing from the nozzles.

Figure 2:
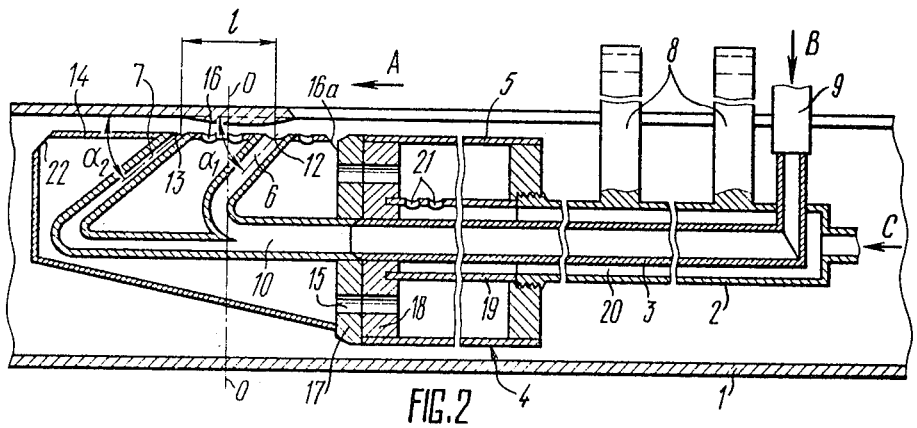
FIG. 2 is the same as FIG. 1, but showing a casing having nozzles.

The additional 7 and the main 6 nozzles in accordance with the embodiment, shown in FIG. 2, are housed in a casing 14 mounted on the casing 5 of the ferrite-holder 4 and communicating with the ferrite-holder through ducts 15 for delivering the cooling medium from the casing 5 to the casing 14. The casing 14 is provided with orifices accommodating the nozzles 6 and 7, as shown on FIG. 2, for supplying oxygen jets to the welding zone and orifices 16, 16a, and 22 for exhausting the cooling medium from the casing.

The casing 14 is shaped as shown on FIG. 2 and has a flange 17 secured to a lid 18 of the ferrite-holder by any type of fasteners. The casing 14 is formed of a material, e.g., copper, having no tendency to adhere to molten metal.

The supporting bar 2 (FIGS. 1 and 2) is shorter than the oxygen duct 3 by the length of the casing 5 of the ferrite-holder 4. The casing 5 accommodates a shell 19 secured by its end to the lid 18 of the ferrite-holder 4, and by its other end, to the end face of the supporting bar 2. The cavity of the shell 19 is arranged coaxially with that of the oxygen duct 3 and continues the cavity of the supporting bar 2 to form an annular cavity 20 along the oxygen duct 3 holding the cooling medium and communicating with the cavity of the casing 5 through orifices 21 in the shell 19.

The direction of motion of the pipe during welding is shown in FIGS. 1 and 2 by arrow A, the direction of oxygen delivery, by arrow B, and that of the cooling medium (water), by the arrow C.

It goes without saying that the apparatus comprises all the necessary accessories and mechanisms ensuring the automatic operation thereof to match that of the mill and well known to those skilled in the art.

OPERATION

The apparatus of the invention operates in the manner below.

As welding of the pipe 1 is begun, oxygen is supplied through the oxygen duct 3. On entering the conduit 10, oxygen is divided into two jets, one being delivered through the main (blowing off) nozzle 6 at an angle of 35° to 45° upon the faces of the heated pipe blank edges and the zone of their joint plastic deformation, and the second, through the additional nozzle 7 at an angle of 15° to 30° upon the flash remaining beyond the axis 0—0 of the welding unit, with the effect that the pipe blank edge deformation zone is enclosed during welding between the two oxygen jets.

The oval shape of the outlet 12 of the main nozzle 6 enhances the density of the oxygen jet in the plane of the edge end faces, i.e. improves the effectiveness of the action thereof upon the heated edges sand increases the amount of the removed flash. The ratio of the axes of the outlet 12 is taken equal to 1.1:1 for the pipe wall thickness of 1.0 mm and large edge approach angle in the heating zone and equal to 2:1 for the pipe wall thickness of 4.0 mm and small edge approach angle in the heating zone of the edges.

The blowing-off oxygen stream from the nozzle 6 fails to remove flash completely, the remainder thereof in the middle of the cross section having a spherical recess with fins along the peripheral boundaries of flash. The remaining flash is removed completely by the second oxygen jet delivered through the additional nozzle 7, the oval shape of the outlet 13 thereof elongated horizontally increasing the density of the oxygen stream along the boundary-adjacent areas of the flash, decreasing it in the axial direction and also ensuring complete flash removal even if the weld deviates from the nozzle axis. The ratio of the axes of the outlet 13 is taken equal to 1.1:1 for pipe wall thickness of 1.0 mm and pipe diameter of 20–40 mm and equal to 3:1 for pipe wall thickness of 5.0 mm and pipe diameter of 219 mm.

The medium (for example, water) for cooling the ferrites flows through the hollow supporting bar 2 and the casing 5 of the ferrite-holder 4 into ducts 15 (FIG. 2) in the lid 18 of the ferrite-holder and in the flange 17 to enter the casing 14. The cooling medium issues through orifices 16 and 16a in the casing 14 to flow over the surface of the casing 14 and the ferrite-holder 4 presented to the edges being welded in the zone where products of metal flash burning are collected. The medium cools the casing to increase the adhesion ability thereof and, additionally, washes off molten metal droplets impinging upon on the casing 14 and the ferrite-holder 4. This eliminates the metal-like build-up on the ferrite-holder 4 and the nozzles 6 and 7, i.e. stabilizes pipe welding conditions. Excess cooling medium flows over inside the pipe through orifices 22 in the end face of the casing 14.

In switching over to the manufacture of pipes of different size, it is necessary to replace the main 6 and the additional 7 nozzles, as well as the ferrite-holder. To this end, the oxygen conduit 10 is disconnected from the oxygen duct 3 together with the nozzles 6 and 7 by undoing the union 11 (FIG. 1) or removing the nozzle 6 and 7 assembly (FIG. 2) together with the protective casing 14 and the flange 17, the ferrite-holder 4 is then removed from the supporting bar 2. A new ferrite-holder 4 and new nozzles are mounted by proceeding in the order reverse to the above.

What is claimed is:

1. An apparatus for removal of internal flash from electric-welded pipes, comprising: a hollow supporting bar inserted into a pipe being welded; an oxygen duct incorporated in said hollow supporting bar; a ferrite-holder mounted on said hollow supporting bar; a main oxygen nozzle of said oxygen duct; an additional oxygen nozzle placed downstream of the main nozzle with respect to the direction of pipe welding; an oxygen conduit serving as a conduit common to said main and additional nozzles mounted on said oxygen duct and communicating therewith; an oval outlet of said main nozzle; an oval outlet of said additional nozzle, the outlets of the main and the additional nozzles having different sized openings; said main and additional nozzles being arranged in a single plane passing through pipe axis and weld; said main and additional nozzles being set in said plane at different acute angles with respect to the weld.

2. An apparatus as claimed in claim 1, wherein said outlet of the main nozzle is formed with its vertical axis greater than its horizontal axis, the ratio of the axes ranging from 2:1 to 1.1:1; said outlet of the additional nozzle is formed with its horizontal axis greater than its vertical axis, the ratio of the axes ranging from 3:1 to 1.1:1.

3. An apparatus as claimed in claims 1 or 2, wherein said outlets of the main and the additional nozzles are adapted to span the pipe blank edge deformation zone during welding.

4. An apparatus as claimed in claim 3, comprising a casing mounted on said ferrite-holder and accommodating said main and additional nozzles together with the oxygen conduit common to them; means for supplying a cooling medium to said ferrite-holder and casing; and orifices formed in said casing and intended for directing said cooling medium to flow between said pipe and said casing.

5. An apparatus as claimed in claim 3, wherein said oxygen duct is set concentrically inside said hollow supporting bar; said hollow supporting bar being shorter than said oxygen duct by the length of the ferrite-holder; a cavity formed inside said ferrite-holder and continuing the cavity of said supporting bar to provide means for supplying a cooling medium.

6. An apparatus as claimed in claims 1 or 2, comprising a casing mounted on said ferrite-holder and accommodating said main and additional nozzles together with the oxygen conduit common to them; means for supplying a cooling medium to said ferrite-holder and casing; and orifices formed in said casing and intended for directing said cooling medium to flow between said pipe and said casing.

7. An apparatus as claimed in claim 6, wherein said oxygen duct is set concentrically inside said hollow supporting bar; said hollow supporting bar being shorter than said oxygen duct by the length of the ferrite-holder; a cavity formed inside said ferrite-holder and continuing the cavity of said supporting bar to provide said means for supplying said cooling medium.

8. An apparatus as claimed in claim 1 or 2, wherein said oxygen duct is set concentrically inside said hollow supporting bar; said hollow supporting bar being shorter than said oxygen duct by the length of the ferrite-holder; a cavity formed inside said ferrite-holder and continuing the cavity of said supporting bar to provide means for supplying a cooling medium.

* * * * *